US011734837B2

(12) United States Patent
Sun et al.

(10) Patent No.: US 11,734,837 B2
(45) Date of Patent: Aug. 22, 2023

(54) SYSTEMS AND METHODS FOR MOTION ESTIMATION

(71) Applicant: SHANGHAI UNITED IMAGING INTELLIGENCE CO., LTD., Shanghai (CN)

(72) Inventors: Shanhui Sun, Lexington, MA (US); Hanchao Yu, Champaign, IL (US); Xiao Chen, Lexington, MA (US); Terrence Chen, Lexington, MA (US)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 269 days.

(21) Appl. No.: 17/039,279

(22) Filed: Sep. 30, 2020

(65) Prior Publication Data

US 2022/0101537 A1  Mar. 31, 2022

(51) Int. Cl.
  *G06T 7/246* (2017.01)
  *G06T 7/00* (2017.01)
  *G06T 3/40* (2006.01)
  *G06N 3/08* (2023.01)

(52) U.S. Cl.
  CPC ............... *G06T 7/248* (2017.01); *G06N 3/08* (2013.01); *G06T 3/4046* (2013.01); *G06T 3/4053* (2013.01); *G06T 7/0014* (2013.01); *G06T 2207/20016* (2013.01); *G06T 2207/20081* (2013.01); *G06T 2207/20084* (2013.01);
  (Continued)

(58) Field of Classification Search
  None
  See application file for complete search history.

(56) References Cited

U.S. PATENT DOCUMENTS

2005/0207491 A1* 9/2005 Zhang .................. H04N 19/543
  375/E7.111
2008/0240500 A1* 10/2008 Huang ................... G06V 10/28
  382/103
(Continued)

FOREIGN PATENT DOCUMENTS

CN  111340844 A  *  6/2020
JP  6746027 B1  *  8/2020  ........... A61B 5/0042
(Continued)

OTHER PUBLICATIONS

Qiao Zheng, Herve Delingette, Nicholas Ayache, Explainable cardiac pathology classification on cine MRI with motion characterization by semi-supervised learning of apparent flow, Medical Image Analysis, vol. 56, 2019, pp. 80-95, ISSN 1361-8415, https://doi.org/10.1016/j.media.2019.06.001.*

(Continued)

*Primary Examiner* — Jiangeng Sun
(74) *Attorney, Agent, or Firm* — Zhong Law LLC (57) ABSTRACT

Described herein are neural network-based systems, methods and instrumentalities associated with estimating the motion of an anatomical structure. The motion estimation may be performed using a feature pyramid and/or a motion pyramid that correspond to multiple image scales. The motion estimation may be performed using neural networks and parameters that are learned via a training process involving a student network and a teacher network pre-pretrained with abilities to apply progressive motion compensation.

15 Claims, 5 Drawing Sheets

(52) U.S. Cl.
CPC .............. *G06T 2207/20221* (2013.01); *G06T 2207/30048* (2013.01)

(56) References Cited

U.S. PATENT DOCUMENTS

| | | | | |
|---|---|---|---|---|
| 2012/0089016 A1* | 4/2012 | Mizuno | ................. | G06T 11/206 600/425 |
| 2014/0201126 A1* | 7/2014 | Zadeh | ..................... | A61B 5/165 706/52 |
| 2018/0293737 A1* | 10/2018 | Sun | .......................... | G06N 3/08 |
| 2020/0084427 A1* | 3/2020 | Sun | ....................... | G06N 3/0454 |
| 2020/0294310 A1* | 9/2020 | Lee | ....................... | G06V 10/751 |

FOREIGN PATENT DOCUMENTS

| | | | | |
|---|---|---|---|---|
| WO | WO-2020150264 A1 | * | 7/2020 | ........... G06K 9/6232 |
| WO | WO-2022068682 A1 | * | 4/2022 | |

OTHER PUBLICATIONS

S. Roujol, J. Benois-Pineau, B. Denis de Senneville, B. Quesson, M. Ries and C. Moonen, "Real time constrained motion estimation for ECG-gated cardiac MRI," 2010 IEEE International Conference on Image Processing, 2010, pp. 757-760, doi: 10.1109/ICIP.2010.5652090.*

Ferdian E, Suinesiaputra A, Fung K, Aung N, Lukaschuk E, Barutcu A, Maclean E, Paiva J, Piechnik SK, Neubauer S, Petersen SE, Young AA. Fully Automated Myocardial Strain Estimation from Cardiovascular MRI-tagged Images Using a Deep Learning Framework in the UK Biobank. Radiol Cardiothorac Imaging. Feb. 27, 2020;2(1).*

Qin et al., "Joint Learning of Motion Estimation and Segmentation for Cardiac MR Image Sequences", arXiv:1806.04066v1 [cs.CV] Jun. 11, 2018, pp. 1-9.

Zheng et al., "Explainable cardiac pathology classification on cine MRI with motion characterization by semi-supervised learning of apparent flow", chalarXiv:1811.03433v2 [cs.CV] Mar. 27, 2019, pp. 1-17.

Wang et al., "A gradient-based optical-flow cardiac motion estimation method for cine and tagged MR images," Medical Image Analysis, Jun. 28, 2019, pp. 1-16.

Puyol-Anton et al., "Fully Automated Myocardial Strain Estimation from Cine MRI using Convolutional Neural Networks," 2018 IEEE 15th International Symposium on Biomedical Imaging (ISBI 2018), pp. 1139-1143.

Rueckert et al., "Nonrigid Registration Using Free-Form Deformations: Application to Breast MR Images," IEEE Transactions on Medical Imaging, vol. 18, No. 8, Aug. 1999, pp. 712-721.

Shen et al., "Consistent Estimation of Cardiac Motions by 4D Image Registration," Conference Paper in Lecture Notes in Computer Science—Feb. 2005, pp. 1-10.

Tobon-Gomez et al., Benchmarking framework for myocardial tracking and deformation algorithms: an open access database, HAL archives-ouvertes Mar. 23, 2013, pp. 1-20.

Kong et al., "Invasive Cancer Detection Utilizing Compressed Convolutional Neural Network and Transfer Learning," Chapter in Lecture Notes in Computer Science Sep. 2018, pp. 1-9.

Liu et al., "DDFlow: Learning Optical Flow with Unlabeled Data Distillation," arXiv:1902.09145v1 [cs.CV] Feb. 25, 2019, pp. 1-8.

Liu et al., "SelFlow: Self-Supervised Learning of Optical Flow," arXiv:1904.09117v1 [cs.CV] Apr. 19, 2019, pp. 1-14.

Sun et al., "PWC-Net: CNNs for Optical Flow Using Pyramid, Warping, and Cost Volume," CVF, IEEE, pp. 8934-8943.

Ranjan et al., "Optical Flow Estimation using a Spatial Pyramid Network," CVF, IEEE, pp. 4161-4170.

Berman et al., "Prognostic validation of a 17-segment score derived from a 20-segment score for myocardial perfusion SPECT interpretation," 2004 by the American Society of Nuclear Cardiology, doi:10.1016/j.nuclcard.2004.03.033, pp. 414-423.

Bernard et al., "Deep Learning Techniques for Automatic MRI Cardiac Multi-structures Segmentation and Diagnosis: Is the Problem Solved?," 2017 IEEE, pp. 1-12.

De Craene et al., "Temporal diffeomorphic free-form deformation: Application to motion and strain estimation from 3D echocardiography," Elsevier, Medical Image Analysis 16 (2012), pp. 427-450.

Hor et al., "Magnetic Resonance Derived Myocardial Strain Assessment Using Feature Tracking," Journal of Visualized Experiments, 2011, pp. 1-7.

Huang et al., "Dynamic MRI Reconstruction with Motion-Guided Network," Proceedings of Machine Learning Research 102: 2019, pp. 275-284.

Krebs et al., "Learning a Probabilistic Model for Diffeomorphic Registration," arXiv:1812.07460v2 [cs.CV] Mar. 17, 2019, pp. 1-16.

Mei et al., "Pyramid Attention Networks for Image Restoration," arXiv:2004.13824v4 [cs.CV] Jun. 3, 2020, pp. 1-19.

Meister et al., "UnFlow: Unsupervised Learning of Optical Flow with a Bidirectional Census Loss," arXiv: 1711.07837v1 [cs.CV] Nov. 21, 2017, pp. 1-9.

Seegoolam et al., "Exploiting Motion for Deep Learning Reconstruction of Extremely-Undersampled Dynamic MRI," Springer Nature Switzerland AG 2019, pp. 704-712.

Shi et al., "A Comprehensive Cardiac Motion Estimation Framework Using Both Untagged and 3-D Tagged MR Images Based on Nonrigid Registration," IEEE Transactions on Medical Imaging, vol. 31, No. 6, Jun. 2012, pp. 1263-1275.

Vigneault et al., "Feature Tracking Cardiac Magnetic Resonance via Deep Learning and Spline Optimization", arXiv:1704.03660v1 [cs.CV] Apr. 12, 2017, pp. 1-12.

Xu et al., "Deep Affinity Net: Instance Segmentation via Affinity," arXiv:2003.06849v1 [cs.CV] Mar. 15, 2020, pp. 1-18.

Yang et al., "A Deep Learning Segmentation Approach in Free-Breathing Real-Time Cardiac Magnetic Resonance Imaging" BioMed Research International vol. 2019, Article ID 5636423, pp. 1-13.

Young et al., "Computational cardiac atlases: from patient to population and back," Experimental Physiology—Review Article, pp. 578-596.

Yu et al., "Computed Tomography Super-Resolution Using Convolutional Neural Networks," IEEE 2017, pp. 3944-3948.

Yu et al., "A Novel Framework for 3D-2D Vertebra Matching," IEEE Conference on Multimedia Information Processing and Retrieval (MIPR), 2019, pp. 1-6.

Yu et al., "FOAL: Fast Online Adaptive Learning for Cardiac Motion Estimation," arXiv:2003.04492v2 [cs.CV] Aug. 14, 2020, pp. 1-11.

* cited by examiner

SYSTEMS AND METHODS FOR MOTION ESTIMATION

BACKGROUND

The motion of a human anatomical structure can provide valuable information about the health of the structure. For example, cardiac motion can be used to calculate subject-specific muscular strain of the myocardium and facilitate the treatment of multiple cardiac diseases such as cardiac arrhythmia, ischemia, cardiomyopathy, valve diseases, etc. The time-varying motion of an anatomical structure such as the human heart can be estimated using deep learning-based or non-deep learning-based techniques to analyze images of the structure recorded at different points in time (e.g., as in a video) and detect and/or track changes from one image to the next. Conventional motion estimation techniques may require a significant amount of segmentation work or annotation efforts and can be very time-consuming. The accuracy of these conventional techniques can also be less than desirable, for example, when there is a large parameter space to be explored or when tissues or organs around a target anatomical structure bear a resemblance to the target structure. Accordingly, it is highly desirable to improve the conventional motion estimation techniques to enhance the accuracy of the estimation and/or to reduce the time required to complete an estimation task.

SUMMARY

Described herein are neural network-based systems, methods and instrumentalities associated with motion estimation. A motion estimation apparatus as described herein may include one or more processors configured to receive or derive a source image of an anatomical structure and a reference image of the anatomical structure (e.g., from a cardiac cine movie) and determine a motion field based on the source and reference images that indicates a motion of the anatomical structure between the source image and the reference image. The motion field may be determined using a feature pyramid and/or a motion pyramid corresponding to multiple image scales (e.g., multiple image resolutions). For example, at each of the multiple image scales, the one or more processors may (e.g., independently) generate a first representation of features from the source image, a second representation of features from the reference image, and a motion field based on the first representation of features and the second representation of features. The respective first representations of features and the respective second representations of features associated with the multiple image scales may form the feature pyramid and the respective motion fields associated with the multiple image scales may form the motion pyramid. The one or more processors may determine a preliminary motion field using the feature pyramid and then refine the preliminary motion field based on the motion pyramid. For example, the one or more processors may refine the preliminary motion field by up-sampling the respective motion fields associated with the multiple image scales and fusing the respective up-sampled motion fields with the preliminary motion field to obtain the refined motion field.

The motion estimation apparatus may be configured to determine the motion fields described herein using one or more artificial neural networks. The parameters of the one or more artificial neural networks may be learned using a student neural network (e.g., comprising replicas of the artificial neural networks of the motion estimation apparatus) via a training process. The training process may be guided by a teacher neural network that is pre-trained with abilities to apply progressive motion compensation when predicting a motion field based on images of the anatomical structure. For example, the teacher neural network may be pre-trained to predict a first motion field based on a source training image and a reference training image, predict a second motion field based on the reference training image and a warped image obtained using the source image and the first motion field, and then derive a refined motion field based on the first and second motion fields. The student neural network may predict a motion field based on the two images of anatomical structure and adjust the parameters of the student neural network at least partially based on a difference between the motion field predicted by the student neural network and the refined motion field predicted by the teacher neural network. To further improve the performance of the student neural network, the training process described herein may be conducted iteratively, for example, by using parameters obtained via a first iteration of prediction to guide a second iteration of prediction.

BRIEF DESCRIPTION OF THE DRAWINGS

A more detailed understanding of the examples disclosed herein may be obtained from the following description, given by way of example in conjunction with the accompanying drawing.

DETAILED DESCRIPTION

The present disclosure is illustrated by way of example, and not by way of limitation, in the figures of the accompanying drawings. Embodiments may be described herein using one or more specific human anatomical structures such as the human heart (e.g., a myocardium) as example, but it should be noted that the techniques disclosed herein are not limited to the example anatomical structures and can be used to estimate and/or track the motion of other anatomical structures as well.

Figure 1:
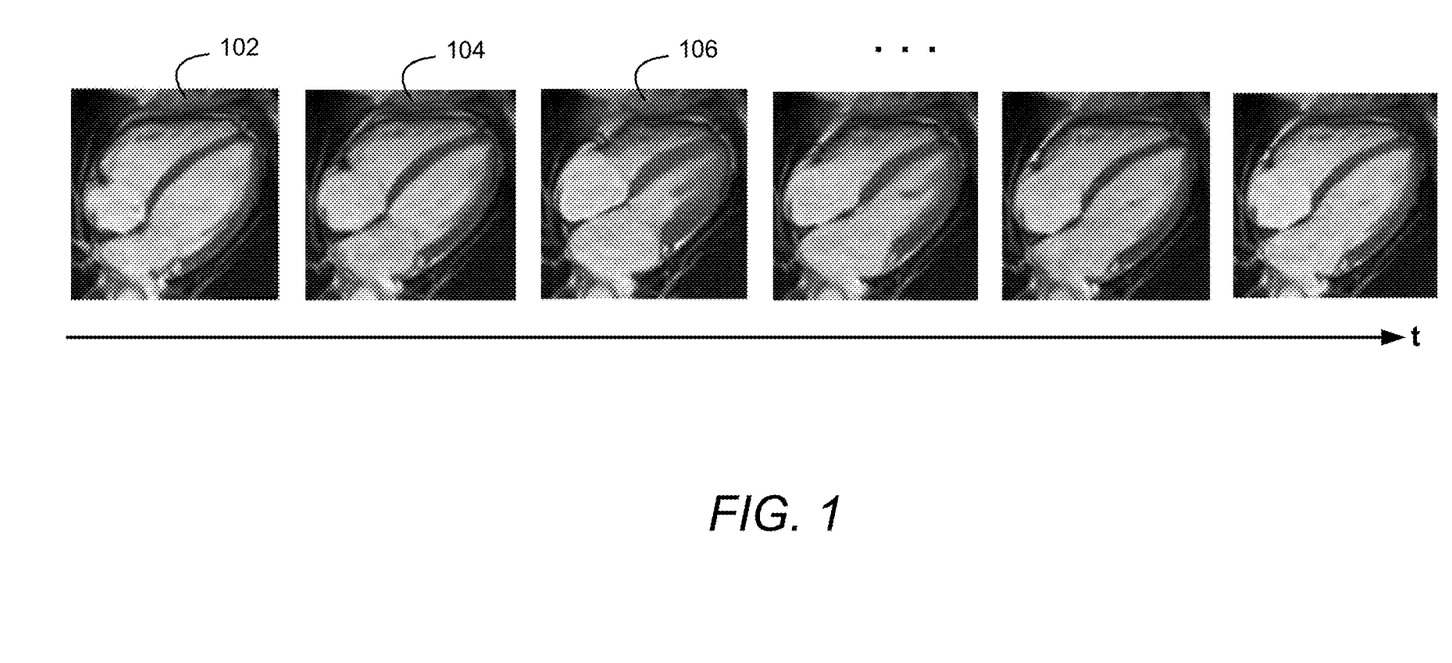
FIG. 1 is a block diagram illustrating an example of cardiac motion estimation and motion tracking.

FIG. 1 is a block diagram illustrating an example of cardiac motion estimation. The motion estimation may be performed based on a magnetic resonance imaging (MRI) video of the heart such as a cine MRI that comprises a plurality of images of the heart recorded at different points in time (e.g., sequential points in time along a time axis t). The cine MRI may depict one or more cycles (e.g., complete or partial cycles) of cardiac contraction and relaxation. For example, the image frames in FIG. 1 show the heart motion starting from relaxation to contraction and then back to relaxation. As such, starting from a first image frame 102 of the cine MRI, the motion of the heart (e.g., the myocardium) between the first image frame 102 and a second image frame 104 may be estimated by comparing the two image frames and identifying changes that have occurred between the time the first image frame 102 is recorded and the time the second image frame 104 is recorded. The second image frame 104 may then be used as a new reference frame, and the estimation process may be repeated for the remaining frames (e.g., frame 106, etc.) to obtain motion information of the heart for a full cardiac cycle.

Various techniques may be used to estimate the motion of the myocardium between two images. In examples, a motion estimation system may first segment the images to identify the myocardium in the images and then apply feature tracking to the segmentation results (e.g., binary segmentation masks) to determine the differences between the two images. The training of such a segmentation-based motion estimation system may require a substantial amount of annotated data. And since image features inside and/or outside the myocardium may be missed or dropped during the segmentation process (e.g., before feature tracking is applied), the accuracy of the motion estimation may be affected. In other examples, a motion estimation system may be configured to determine the motion of the myocardium directly from the images (e.g., based on image features) using deep learning-based models and/or methods. Since ground truth data for myocardial motion may be difficult to obtain, such an image content-based motion estimation system may be trained in a self-supervised manner (e.g., as described in greater detail below).

Figure 2:
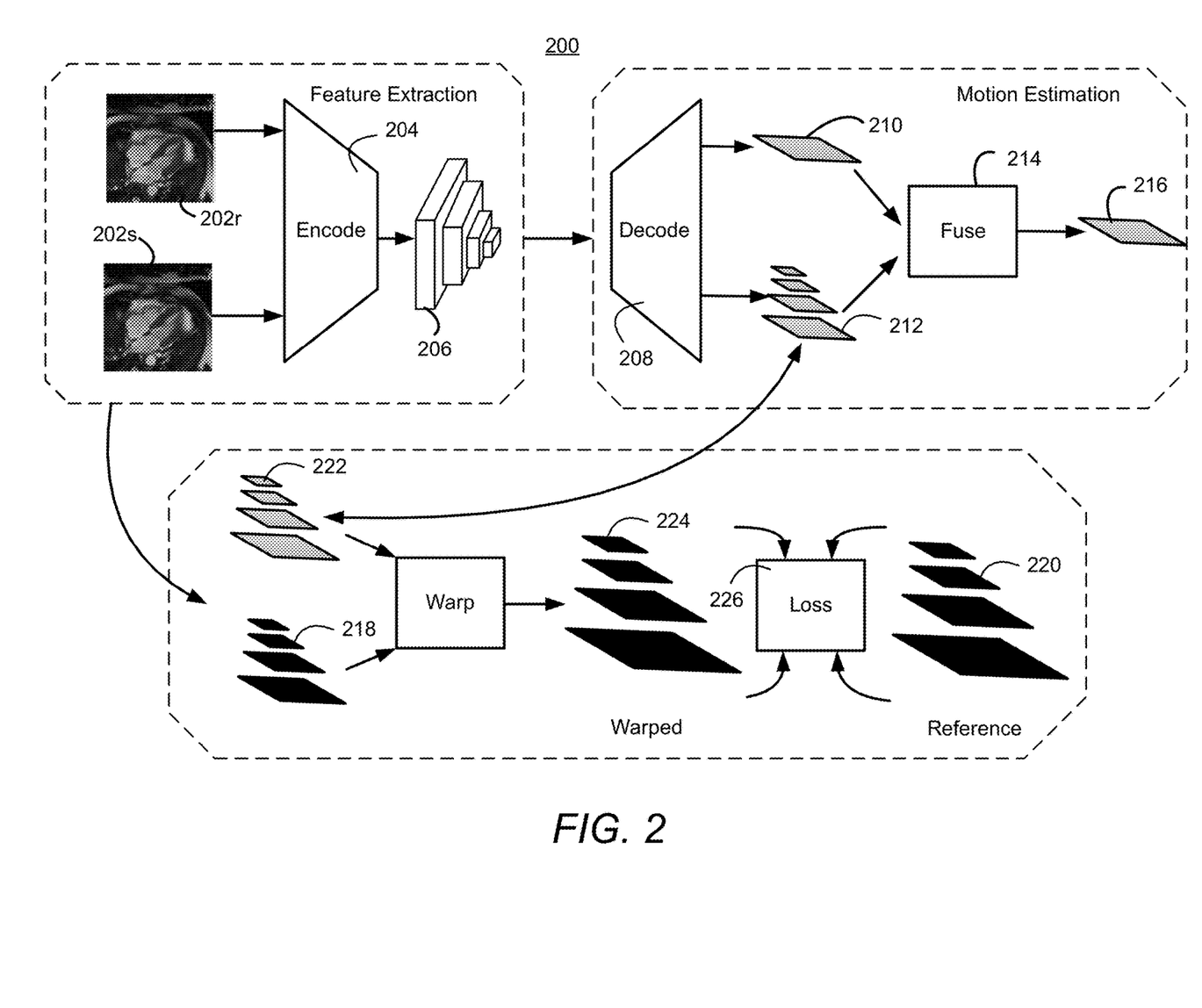
FIG. 2 is a block diagram illustrating an example motion estimation system as described herein.

FIG. 2 illustrates an example system 200 that may be configured to estimate and/or track a motion of an anatomical structure (e.g., a myocardium) based on images of the anatomical structure. As shown, the system 200 may receive or derive (e.g., from a cardiac cine MRI) a source image 202s and a reference image 202r of the myocardium. The source image 202s and reference image 202r may be captured at different points in time (e.g., consecutive times along a time axis) and may depict respective states of the myocardium at those times. The system 200 may further comprise a feature extraction component such as an encoder 204 configured to receive the source image 202s and the reference image 202r and extract respective visual features from the images. The encoder 204 may include a convolutional neural network and/or a fully connected neural network each comprising a plurality of layers such as one or more convolutional layers, one or more pooling layers and/or one or more fully connected layers. The encoder 204 may be trained to extract features from the source image 202s and the reference image 202r, respectively, by performing a series of convolution and down-sampling operations through the layers of the neural network(s) comprised in the encoder 204. For example, each of the convolutional layers of the encoder 204 may include a plurality of convolution kernels or filters (e.g., with a kernel size of 3×3 or 5×5) configured to extract specific features from the source image 202s and the reference image 202r. The convolution operation may be followed by batch normalization and/or non-linear activation, and the features extracted by the convolutional layers (e.g., in the form of one or more feature maps or feature vectors) may be down-sampled through one or more pooling layers (e.g., using a 2×2 window and a stride of 2) to reduce the redundancy and/or dimension of the features by various factors (e.g., by factors of 2, 4, etc.).

The encoder 204 may extract features from the source image 202s and the reference image 202r at each of multiple image scales (e.g., corresponding to different image resolutions, different levels of abstraction, etc.). The multiple image scales may be obtained, for example, by the down-sampling operation described herein. The encoder 204 may generate respective representations (e.g., feature maps or feature vectors) of the features extracted from the source image 202s and reference image 202r at each of the multiple image scales. For example, at each of the multiple image scales, the encoder 204 may generate a first representation (e.g., a first feature map or feature vector) of the features extracted from the source image 202s and a second representation (e.g., a second feature map or feature vector) of the features extracted from the reference image 202r. Collectively, the respective first representations of features and the respective second representations of features associated with the multiple image scales may form a feature pyramid 206, with each layer of the feature pyramid corresponding to a respective image scale and including respective first and second representations of features extracted from the source image 202s and the reference image 202r at the image scale.

The system 200 may further include a motion estimation component such as a decoder 208 (e.g., a multi-scale decoder) that may be configured to receive the feature pyramid 206, analyze (e.g., compare) the respective feature representations associated the source image 202s and the reference image 202r, and predict an initial or preliminary motion field 210 (e.g., a flow field) that indicates a change (e.g., motion) of the anatomical structure from the source image 202s to the reference image 202r. The decoder 208 may comprise a convolutional neural network and/or a fully connected neural network each including a plurality of layers such as one or more convolutional layers, one or more un-pooling layers, and/or one or more fully connected layers. Through these layers, the decoder 208 may perform a series of up-sampling and/or transposed convolution (e.g., deconvolution) operations on the respective feature representations included in the feature pyramid 206 (e.g., at the multiple image scales represented by the feature pyramid 206). For example, the decoder 208 may up-sample the feature representations included in the feature pyramid 206 via the one or more un-pooling layers (e.g., based on pooled indices provided by the encoder 204) and the one or more convolutional layers (e.g., using 3×3 or 5×5 transposed convolutional kernels and/or a stride of 2) to obtain up-sampled (e.g., dense) versions of the feature representations (e.g., the feature representations may be up-sampled to a same size). The decoder 208 may then concatenate the up-sampled feature representations and derive the initial or preliminary motion field 210 based on the concatenated feature representations. The initial or preliminary motion field 210 may include a vector field, a grid of vectors, a vector-value function, and/or the like that indicate disparities or displacements of features between the source image 202s and the reference image 202r.

In addition to the motion field 210, the system 200 may be further configured to predict a respective motion field at each of the multiple image scales described herein, for example, based on the feature representations generated for that image scale. These additional motion fields may be determined using the decoder 208. For instance, the decoder 208 may be further configured to, at each of the multiple image scales described herein, obtain the first representation of features of the source image 202s and the second representation of features of the reference image 202r that are associated with the image scale from the corresponding layer of the feature pyramid 206, and determine a motion field based on the first and second representations. The decoder 208 may determine the motion field at each of the multiple image scales using similar techniques as described herein for deriving the motion field 210 (e.g., the decoder 208 may be a multi-scale decoder). The respective motion fields associated with the multiple image scales may be determined independently from each other (e.g., the motion field for a first image scale may be determined without relying on the motion field for a second image scale), and the motion fields thus determined may form a motion pyramid 212 where the motion field at each layer of the motion pyramid 212 may indicate a change (e.g., motion) of the anatomical structure from the source image 202s to the reference image 202r at the corresponding image scale.

The system 200 may be configured to refine the initial or preliminary motion field 210 using the motion pyramid 212. For example, the system 200 may include a fusion component 214, and the decoder 208 may up-sample the respective motion fields of the motion pyramid 212 (e.g., corresponding to the multiple image scales described herein) and provide the up-sampled motion fields to the fusing component 214. The fusion component 214 may comprise one or more neural network layers such as one or more convolutional layers and may be configured to fuse the up-sampled motion fields provided by the decoder 208 with the initial or preliminary motion field 210 to obtain a refined motion field 216 that indicates the motion of the anatomical structure from the source image 202s to the reference image 202r. In examples, the fusion operation may be performed by determining an average of the up-sampled motion fields and the initial motion field 210 and determining the refined motion field 216 based on the average. In examples, the fusion operation may be performed by (e.g., after up-sampling the motion fields in the motion pyramid) applying (e.g., multiplying) respective scaling factors to the up-sampled motion fields (e.g., to ensure the motion fields are comparable with each other) and/or performing one or more convolution operations to improve the result of the fusion. In examples, the fusion operation may be performed based on energy minimization.

The motion estimation techniques are described herein with reference to the encoder 204, the decoder 208, and the fusing component 214. It should be noted, however, that the proposed motion estimation techniques are not limited to using these example structures or components and may be implemented using other types of neural networks and/or machine-learning models without impacting the efficiency and/or effectiveness of the techniques.

The system 200 (e.g., the neural networks of the system 200) may be trained to perform the motion estimation tasks described herein in a self-supervised (e.g., unsupervised) manner. For example, the training of the system 200 may be conducted using source and reference images of the anatomical structure (e.g., a myocardium) depicted in the source image 202s and reference images 202r. During the training, a source training image may be down-sampled to different scales to obtain a plurality of down-sampled versions 218 of the source training images. Similarly, a reference training image may be down-sampled to the same scales to obtain a plurality of down-sampled versions 220 of the reference training images. The system 200 may predict a motion pyramid 222 (e.g., similar to the motion pyramid 212 described herein) using preliminary neural network parameters (e.g., weights associated with various neural network filters). The down-sampled versions 218 of the source training image may then be warped with the predicted motion pyramid 222 to generate warped images 224 and the neural network parameters of the system 200 may be adjusted based on a difference or loss 226 between the warped images 224 and the down-sampled versions 220 of the reference training image. Such a difference may be determined, for example, based on mean squared errors (MSE) between the warped images 224 and the down-sampled reference images 220. In examples, the MSE may be used together with a smoothness loss (e.g., a second-order smoothness loss that constrains the prediction of changes from the source training image to the reference training image), and a total loss $L_{total}$ for one or more (e.g., all) image scales as illustrated below may be used to guide the adjustments of the neural network parameters of the system 200, where $l$ may represent each image scale included in the total loss determination and $\lambda$ may represent a weight (e.g., such as a Huber loss weight) assigned to the smoothness loss at each image scale.

$$L_{total} = \Sigma L^{(l)}_{MSE} + \Sigma \lambda L^{(l)}_{smooth}$$

The smoothness loss described herein may limits the space in which the system 200 (e.g., the neural networks of the system 200) may search for optimal parameters to accommodate a wide range of motion variations of an anatomical structure. Relaxing the smoothness constraints may expand the parameter space of the system 200, but the expansion may increase the sensitivity to the system 200 to disturbances such as noises and abrupt intensity changes in source and reference images. The system 200 may be configured to apply progressive motion compensation, for example, at an interference stage to prevent anatomically unrealistic predictions while maintaining motion tracking accuracy (e.g., even in cases of significant motion variations). As an example of progressive motion compensation, a large motion may be predicted based on multiple small, intermediate predictions. For example, given a source image $I_A$ and a reference image $I_B$ of an anatomical structure, rather than directly predicting a motion field $F_{AB}$ to indicate the motion of the anatomical structure from the source image to the reference image, one or more intermediate motion fields $F_{AC}$ and $F_{CB}$ may be predicted (e.g., in respective step 1 and step 2 to satisfy a smoothness constraint) and then combined to derive the motion field $F_{AB}$ (e.g., a refined motion field). To illustrate, suppose $x_0=(x; y)$ is a pixel in the source image $I_A$ and $x_2$ is a corresponding pixel in the reference image $I_B$. An intermediate pixel $x_1$ (e.g., in a warped intermediate image $I_C$) may be derived as $x_1=F_{AC}(x_0)+x_0$ and the pixel $x_2$ may be derived as $x_2=F_{CB}(x_1)+x_1$. Replace $x_1$ with $x_0$ in the latter equation, the following may be derived: $F_{AB}(x_0)=F_{AC}(x_0)+F_{CB}(F_{AC}(x_0)+x_0)$. The forgoing derivation is based on forward warping (e.g., using $F_{AB}$ to warp source image $I_A$). The same results may be achieved using backward warping (e.g., using $F_{AB}$ to warp the reference image $I_B$). Further, even though a two-step process is described herein, more than two intermediate motion field predictions (e.g., more than two intermediate prediction steps) may be performed to accomplish the desired motion compensation.

Figure 3:
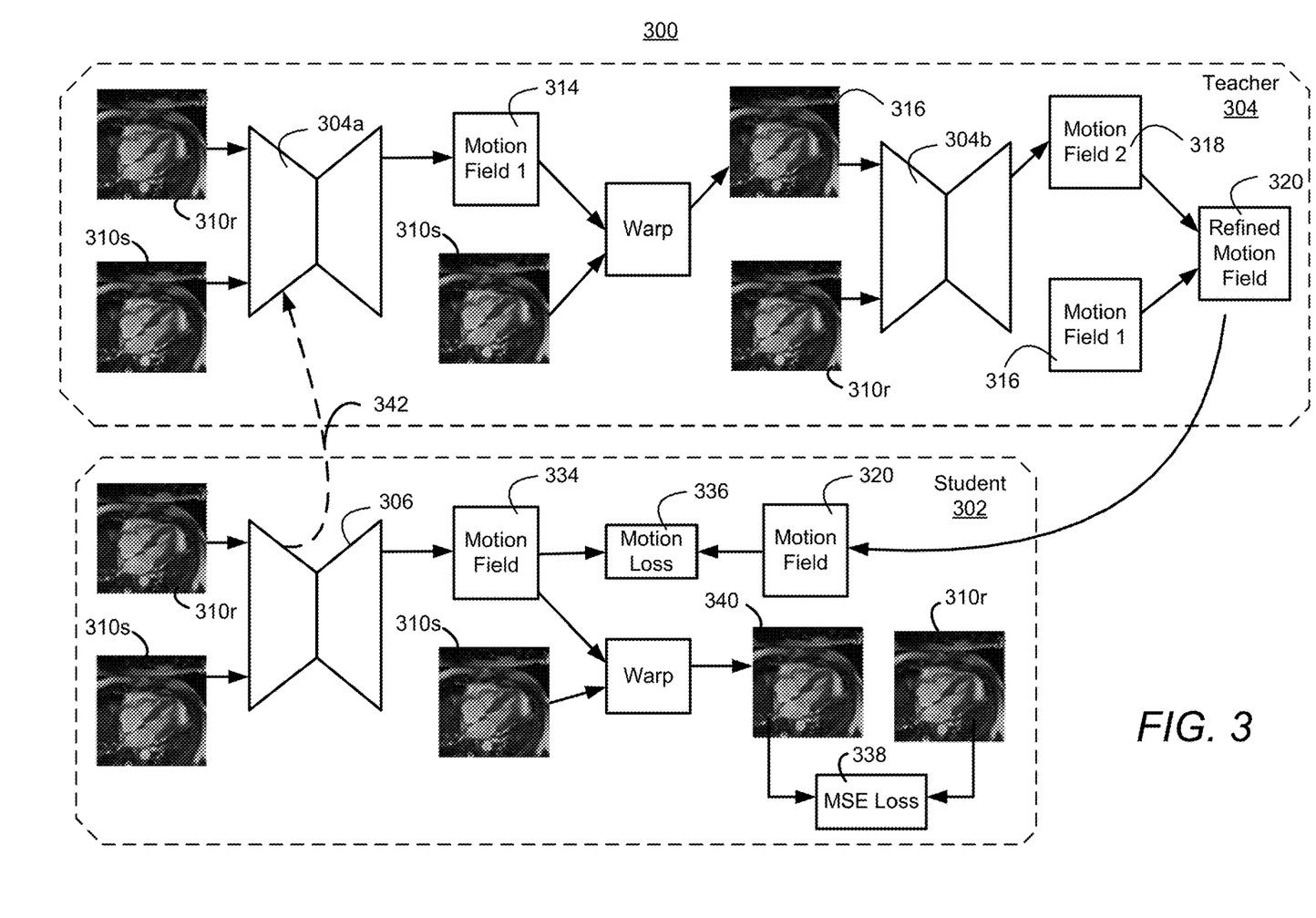
FIG. 3 is a block diagram illustrating an example process for learning parameters that may enable the motion estimation system of FIG. 2 to apply progressive motion compensation.

The progressive motion compensation techniques described herein may improve the accuracy of motion estimation but may also lead to increased inference time, for example, due to the multiple intermediate predictions or multiple steps involved in the prediction process. The system 200 (e.g., the neural networks of the system 200) may learn parameters (e.g., learn a prediction model) for accomplishing the desirable outcome of progressive motion compensation without actually performing multiple intermediate predictions. These parameters (e.g., the prediction model) may be acquired via a training process (e.g., a machine learning process) that utilizes a teacher neural network pre-trained to predict a motion field based on two images of an anatomical structure via progressive motion compensation. FIG. 3 illustrates such a process 300.

The training process 300 may be conducted using at least a student neural network 302 and a teacher neural network 304. The student neural network 302 may include substantially similar components and/or structures as the neural networks of system 200 shown in FIG. 2 (e.g., including the encoder 204 and/or the decoder 208). For example, the student neural network 302 may include a neural network 306 that includes a replica of the encoder 204 and a replica of the decoder 208 of system 200 (e.g., except that the student neural network 302 has yet to learn the parameters the neural network 306 for predicting a motion field based on images of an anatomical structure). The teacher neural network 304 may be pre-trained to predict a motion field via progressive motion compensation based on images of an anatomical structure (e.g., a myocardium). For example, the teacher neural network 304 may include at least a first neural network 304a and a second neural network 304b each of which may in turn include an encoder network and a decoder network (e.g., similar to the encoder 204 and decoder 208 of the system 200). During the pre-training, the first neural network 304a may acquire parameters for predicting a first motion field (e.g., such as the motion field $F_{AC}$ described herein) based on a source training image and a reference training image, and the second neural network 304b may acquire parameters for predicting a second motion field (e.g., such as the motion field $F_{CB}$ described herein) based on the first motion field predicted by the first neural network 304a and a warped image derived using the source training image and the first motion field (e.g., similar to the derivation of the warped image $I_C$ described herein). Based on the first and second motion fields, a refined motion field may then be derived, e.g., similar to the derivation of the motion field $F_{AB}$ described herein.

The teacher neural network 304 (e.g., with its parameters acquired via the pre-training) may guide (e.g., constrain) the student neural network 302 during the training process 300. For example, the student neural network 302 and the teacher neural network 304 may both receive a source training image 310s and a reference training image 310r during the training process 300. Based on the source training image 310s and the reference training image 310r, the teacher neural network 304 may predict a first motion field 314 via the first neural network 304a (e.g., using parameters acquired during the pre-training). The teacher neural network 304 may then derive a warped image 316 based on the source training image 310s and the first motion field 314. Using the warped image 316 and the reference training image 310r as inputs, the teacher neural network 304 may then predict a second motion field 318 via the second neural network 304b (e.g., using parameters acquired during the pre-training). And based on the first motion field 314 and the second motion field 318, the teacher neural network 304 may determine a refined motion field 320, for example, as described herein.

As another part of the training process 300, the student neural network 302 may predict a motion field 334 based on the source training image 310s and the reference training image 310r via the neural network 306 (e.g., using initial parameters that may be copied from the parameters of the neural network 304a or 304b or sampled from one or more probability distributions). The student neural network 302 may then adjust its parameters in a self-supervised manner, for example, based on a difference between the motion field 334 and the refined motion field 320 determined by the teacher neural network 304. Such a difference may be determined, for example, using a motion loss function 336 such as $L_{flow}=\|f^r_{AB}-f^s_{AB}\|_2$, wherein $f^r_{AB}$ may represent the refined motion field 320 determined by the teacher neural network 304 and $f^s_{AB}$ may represent the motion field 334 determined by the student neural network 302. In examples, the student neural network 302 may also consider a second loss 338 (e.g., $L_{MSE}$) when adjusting the parameters of the neural network 306. This second loss 338 may be determined, for example, based on a difference (e.g., an MSE) between the reference training image 310r and a warped image 340 derived based on the motion field 334 and the source training image 310s. In examples, the student neural network 302 may further consider a smoothness loss $L_{smooth}$ (e.g., a second-order smoothness loss and not shown in FIG. 3) when adjusting the parameters of the neural network 306 to ensure that the predicted motion from the source training image to the reference training image does not exceed a certain threshold. When all three losses are considered, a total loss may be expressed as follows:

$$L_{total}=L_{flow}+\mu L_{MSE}+\Upsilon L_{smooth}$$

where $\mu$ and $\Upsilon$ may represent weights that may be assigned to the MSE loss and the smoothness loss, respectively.

Thus, through the guidance and/or supervision of the teacher neural network 304, the student neural network 302 may learn parameters during the training process 300 that may enable the student neural network (e.g., and thus the system 200 described herein) to attain the progressive inference capabilities (e.g., multiple-step progressive motion compensation) of the teacher neural network 304. To further improve the student neural network's inference capability, cyclic training may be conducted in certain embodiments during which, when the prediction results of the teacher and student neural networks (e.g., the motion field 320 and the motion field 336) converge, the parameters of the neural network 306 may be copied to the neural network 304a and/or 304b of the teacher neural network 304, or the neural network 304a and/or 304b of the teacher neural network 304 may be replaced by the neural network 306. This way, the student neural network may take the role of the teacher neural network before a new round of teacher-student training is conducted and the performance of the student neural network 302 may be continuously improved through a cyclic (e.g., self-taught) learning process.

An estimated motion may be used to calculate various clinical parameters or indices. For example, an estimated cardiac motion may be used to determine strains along a radial direction and/or a circumferential direction of a myocardium, and, with other anatomical structures, the motion of the anatomical structures in a specific direction may similarly provide valuable information about the health conditions of the anatomical structures. Accordingly, errors in motion estimation may be evaluated along certain directions to better align with clinical interests and/or to facilitate validation, quality assessment, and neural network training (e.g., directional errors may be included as a part of the training losses). Using cardiac motion estimation as an example, an estimation error may be decomposed in a radial and/or a circumferential direction. For instance, a center of the myocardium region may be determined as $$x_c = \frac{1}{N}\sum_{x_c \in myo}^{N} x_i.$$

The radial direction of one or more points (e.g., every point) within the myocardium may be computed as $d(x_i)=x_i-x_c$ and normalized to a unit vector. An endpoint error vector $e_i$ at $x_i$ may be determined as $e_i=f(x_i)-\hat{f}(x_i)$ (e.g., representing differences between the estimation results and the ground truth)

and decomposed along a radial direction ($\varepsilon_{rr}$) and a circumferential direction ($\varepsilon_{cc}$) as shown below. At least one of the errors may then be used to guide the adjustment of the neural network parameters described herein.

$$\varepsilon^{(i)}_{rr} = e_i \cdot d(x_i) \text{ and } \varepsilon^{(i)}_{cc} = e_i - \varepsilon^{(i)}_{rr}$$

Each of the neural networks described herein may comprise multiple layers and each of the layers may correspond to a plurality of filters (e.g., kernels) having respective weights. The weights (e.g., the parameters described herein) may be learned through a training process that comprises inputting a large number of images from one or more training datasets to the neural networks, calculating differences or losses between a prediction result and a ground truth (e.g., an expected result) based on a loss function such as MSE, L1/L2 norms, a margin based loss, etc., and updating the weights assigned to the filters to minimize the differences or losses (e.g., based on a stochastic gradient descent of the loss function).

Figure 4:
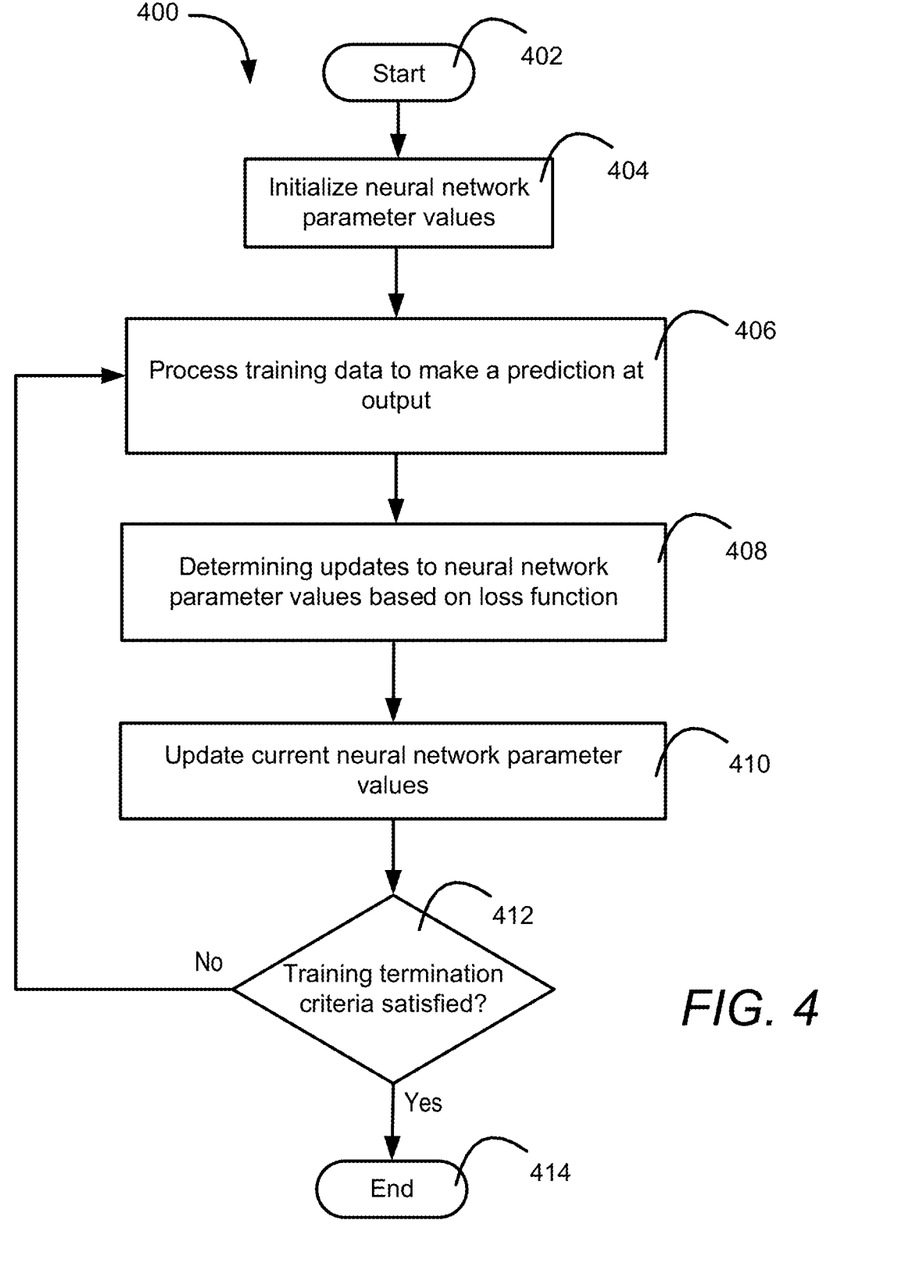
FIG. 4 is a flow diagram illustrating an example process for training a neural network that may be included in the motion estimation system of FIG. 2.

FIG. 4 is a flow diagram of an example process 400 that may be implemented and executed during training of a neural network described herein. The process 400 may be performed by a system of one or more computers (e.g., one or more processors) located in one or more locations. The process 400 may start at 402 and, at 404, the system may initialize the operating parameters of the neural network (e.g., weights associated with one or more layers of the neural network). For example, the system may initialize the parameters based on samples from one or more probability distributions or parameter values of another neural network with a similar architecture. At 406, the system may process one or more training images using the parameter values currently assigned to the layers. A prediction may be made as a result of the processing and at 408, the system may determine updates to the current parameter values, e.g., based on an objective or loss function and a gradient descent of the function. As described herein, the objective or loss function may be designed to minimize the difference between the prediction and an expected result (e.g., a ground truth). The objective function may be implemented using, for example, mean squared errors, L1 and/or L2 norms, etc. At 410, the system may update the current values of the neural network parameters, for example, through a backpropagation process. At 412, the system may determine whether one or more training termination criteria are satisfied. For example, the system may determine that the training termination criteria are satisfied if the system has completed a predetermined number of training iterations, or if the change in the value of the loss function between two training iterations falls below a predetermined threshold. If the determination at 412 is that the training termination criteria are not satisfied, the system may return to 406. If the determination at 412 is that the training termination criteria are satisfied, the system may end the training process 400 at 414.

Figure 5:
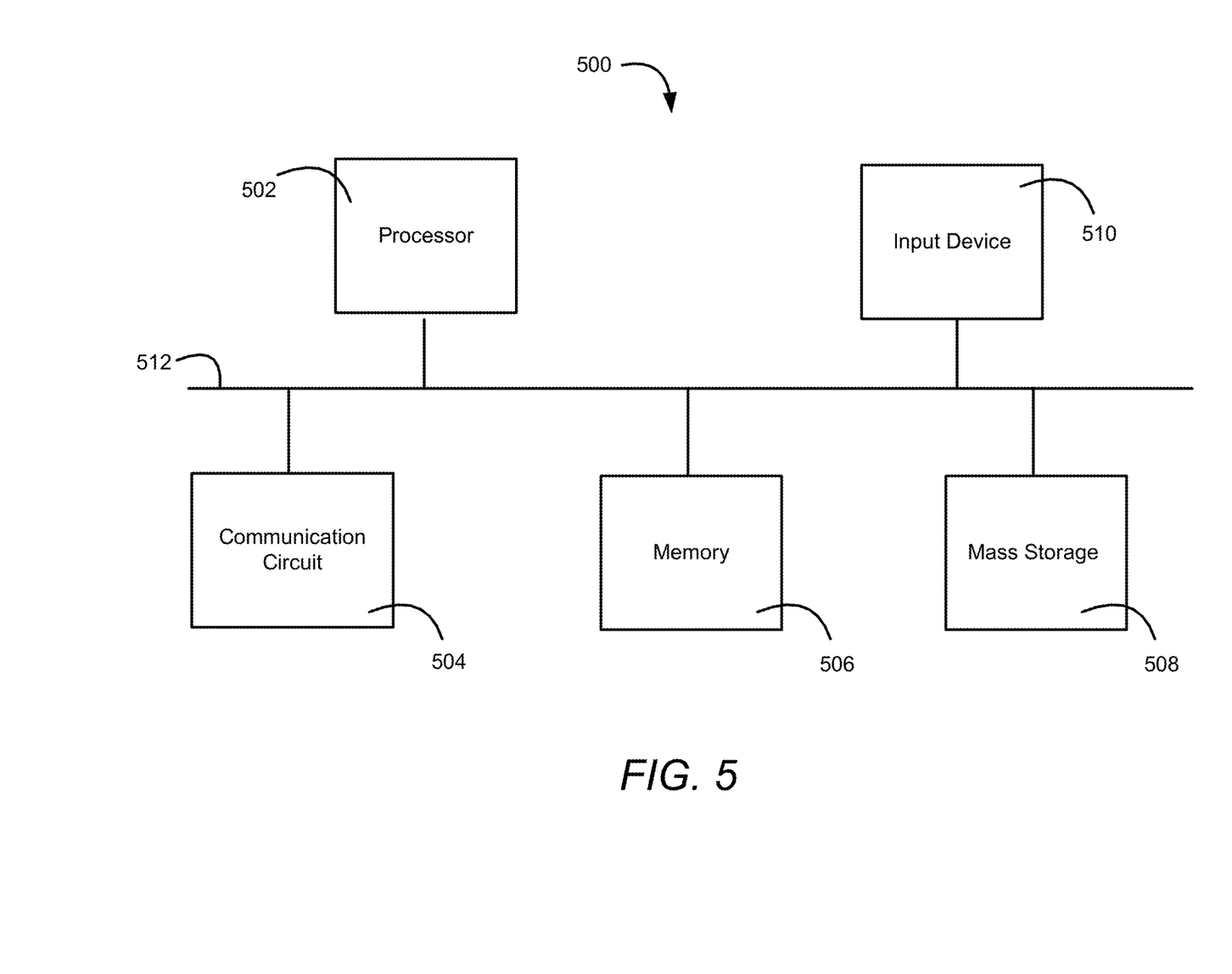
FIG. 5 is a block diagram illustrating example components of the motion estimation system of FIG. 2.

The motion estimation system described herein (e.g., such as the system 200 in FIG. 2) may be implemented using one or more processors, one or more storage devices, and/or other suitable accessory devices such as display devices, communication devices, input/output devices, etc. FIG. 5 is a block diagram illustrating an example motion estimation system 500 as described herein. As shown, the motion estimation system 500 may include a processor (e.g., one or more processors) 502, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. The motion estimation system 500 may further include a communication circuit 504, a memory 506, a mass storage device 508, an input device 510, and/or a communication link 512 (e.g., a communication bus) over which the one or more components shown in FIG. 5 may exchange information. The communication circuit 504 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). The memory 506 may include a storage medium configured to store machine-readable instructions that, when executed, cause the processor 502 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. The mass storage device 508 may include one or more magnetic disks such as one or more internal hard disks, one or more removable disks, one or more magneto-optical disks, one or more CD-ROM or DVD-ROM disks, etc., on which instructions and/or data may be stored to facilitate the operation of the processor 502. The input device 510 may include a keyboard, a mouse, a voice-controlled input device, a touch sensitive input device (e.g., a touch screen), and/or the like for receiving user inputs to the motion estimation system 500.

It should be noted that the motion estimation system 500 may operate as a standalone device or may be connected (e.g., networked or clustered) with other computation devices to perform the functions described herein. And even though only one instance of each component is shown in FIG. 5, a skilled person in the art will understand that the motion estimation system 500 may include multiple instances of one or more of the components shown in the figure. Furthermore, although the examples are described herein with reference to various types of neural networks, various types of layers, and/or various tasks being performed by certain types of neural networks or layers, those references are made merely for illustration purposes and not meant to limit the scope of the disclosure. In addition, the operation of the example motion estimation system is depicted and described herein with a specific order. It should be appreciated, however, that these operations may occur in various orders, concurrently, and/or with other operations not presented or described herein. And not all operations that the motion estimation system is capable of performing are depicted and described herein, and not all illustrated operations are required to be performed by the system.

For simplicity of explanation, the operation of the example system is depicted and described herein with a specific order. It should be appreciated, however, that these operations may occur in various orders, concurrently, and/or with other operations not presented or described herein. Furthermore, it should be noted that not all operations that the system is capable of performing are depicted and described herein, and not all illustrated operations are required to be performed by the system.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus for motion tracking, comprising one or more processors, wherein the one or more processors are configured to:
   obtain a source image of an anatomical structure and a reference image of the anatomical structure;
   at each of multiple image scales, generate a first representation of features based on the source image, a second representation of features based on the reference image, and a motion field based on the first representation of features and the second representation of features, wherein the motion field indicates a change of the anatomical structure from the source image to the reference image, wherein the respective first representations of features associated with the multiple image scales and the respective second representations of features associated with the multiple image scales form a feature pyramid, and wherein the respective motion fields associated with the multiple image scales form a motion pyramid;
   determine a preliminary motion field based on the feature pyramid; and
   refine the preliminary motion field based on the motion pyramid to obtain a refined motion field,
   wherein the motion field associated with each of the multiple image scales is determined using a student neural network, wherein parameters of the student neural network are learned via a training process guided by a teacher neural network, and wherein, during the training process:
      the teacher neural network is configured to predict a motion between two training images of the anatomical structure via a progressive motion compensation process that includes determining multiple intermediary motion fields and predicting the motion between the two training images based on the multiple intermediary motion fields;
      the student neural network is configured to directly predict the motion between the two training images; and
      the parameters of the student neural network are adjusted based on a difference between the motion predicted by the student neural network and the motion predicted by the teacher neural network.

2. The apparatus of claim 1, wherein the multiple image scales correspond to respective image resolutions.

3. The apparatus of claim 1, wherein the motion fields associated with the multiple image scales are determined independently from each other.

4. The apparatus of claim 1, wherein the one or more processors being configured to refine the preliminary motion field based on the motion pyramid comprises the one or more processors being configured to up-sample the respective motion fields associated with the multiple image scales and fuse the respective up-sampled motion fields with the preliminary motion field to obtain the refined motion field.

5. The apparatus of claim 4, wherein the one or more processors being configured to refine the preliminary motion field based on the motion pyramid further comprises the one or more processors being configured to apply respective scaling factors to the up-sampled motion fields prior to fusing the up-sampled motion fields with the preliminary motion field.

6. The apparatus of claim 1, wherein the two training images comprise a source training image and a reference training image and wherein the teacher neural network being configured to predict the motion between the two training images via the progressive motion compensation process comprises the teacher neural network being configured to:
   predict a first intermediary motion field based on the source training image and the reference training image;
   predict a second intermediary motion field based on the reference training image and a warped image obtained using the source image and the first intermediary motion field; and
   predict the motion between the two training images based on the first intermediary motion field and the second intermediary motion field.

7. The apparatus of claim 6, wherein the parameters of the student neural network are learned using the motion predicted by the teacher neural network as ground truth.

8. The apparatus of claim 1, wherein the training process comprises multiple training iterations and wherein the parameters of the student neural network obtained via a first training iteration are copied to the teacher neural network and used to guide the student neural network during a second training iteration.

9. The apparatus of claim 1, wherein the anatomical structure comprises a myocardium and wherein, during the training process, a motion estimation error is decomposed into a first error along a radial direction and a second error along a circumferential direction and the parameters of the student neural network are adjusted based on at least one of the first error or the second error.

10. A method for tracking a motion of an anatomical structure, the method comprising:
   obtaining a source image of the anatomical structure and a reference image of the anatomical structure;
   at each of multiple image scales, generating a first representation of features based on the source image, a second representation of features based on the reference image, and a motion field based on the first representation of features and the second representation of features, wherein the motion field indicates a change of the anatomical structure from the source image to the reference image, wherein the respective first representations of features associated with the multiple image scales and the respective second representations of features associated with the multiple image scales form a feature pyramid and the respective motion fields associated with the multiple image scales form a motion pyramid;

determining a preliminary motion field based on the feature pyramid; and refining the preliminary motion field based on the motion pyramid to obtain a refined motion field, wherein the motion field associated with each of the multiple image scales is determined using a student neural network, wherein parameters of the student neural network are learned via a training process guided by a teacher neural network, and wherein, during the training process:

the teacher neural network is configured to predict a motion between two training images of the anatomical structure via a progressive motion compensation process that includes determining multiple intermediary motion fields and predicting the motion between the two training images based on the multiple intermediary motion fields;

the student neural network is configured to directly predict the motion between the two training images; and the parameters of the student neural network are adjusted based on a difference between the motion predicted by the student neural network and the motion predicted by the teacher neural network.

11. The method of claim 10, wherein the motion fields associated with the multiple image scales are determined independently from each other.

12. The method of claim 10, wherein refining the preliminary motion field based on the motion pyramid comprises up-sampling the respective motion fields associated with the multiple image scales and fusing the respective up-sampled motion fields with the preliminary motion field to obtain the refined motion field.

13. The method of claim 12, wherein refining the preliminary motion field based on the motion pyramid further comprises applying respective scaling factors to the up-sampled motion fields prior to fusing the up-sampled motion fields with the preliminary motion field.

14. The method of claim 10, wherein the two training images comprise a source training image and a reference training image and wherein the teacher neural network being configured to predict the motion between the two training images via the progressive motion compensation process comprises the teacher neural network being configured to:

predict a first intermediary motion field based on the source training image and the reference training image;

predict a second intermediary motion field based on the reference training image and a warped image obtained using the source image and the first intermediary motion field; and predict the motion between the two training images based on the first intermediary motion field and the second intermediary motion field.

15. The method of claim 14, wherein the training process comprises multiple training iterations and wherein the parameters of the student neural network obtained via a first training iteration are copied to the teacher neural network and used to guide the student neural network during a second training iteration.

\* \* \* \* \*